United States Patent Office 3,331,660
Patented July 18, 1967

3,331,660
PROCESS FOR PRODUCING A FIBROUS TITANIUM DIOXIDE CONTAINING MATERIAL
Kenneth L. Berry, Hockessin, Del., and Roland H. Wetzel, Landenberg, Pa., assignors to E. I. du Pont de Nemours and Company, Wilmington, Del., a corporation of Delaware
No Drawing. Filed May 20, 1964, Ser. No. 369,009
8 Claims. (Cl. 23—51)

This invention relates to inorganic fibrous materials and to their preparation. More particularly, the invention relates to fibrous compositions of titanium dioxide in which the titanium dioxide is predominantly in the rutile or anatase form and to a method for preparing said fibrous titanium dioxide compositions.

Titanium dioxide is more commonly produced in a finely-divided state as a white pigment which is used extensively in paints, papers, ceramics and as a delustrant in many plastic materials. Until recently, titanium dioxide was known to exist only in a finely-divided state as the anatase, rutile or Brookite crystalline modifications. Fibrous, feltable titanium dioxide was first described in U.S. Patent 3,030,183. This patent discloses an acicular fibrous form of rutile titanium dioxide having a fiber cross-section of less than 25 microns and an axial ratio, that is a ratio of length to cross-sectional dimension, of at least 10 to 1. Fibers of this material are feltable and form mats or felts when filtered from dilute liquid suspensions. However, fibrous titanium dioxide having the rutile ar anatase crystalline modifications could not be selectively prepared by known prior art methods.

An object of this invention is to provide novel fibrous titanium dioxide compositions. Another object of this invention is to provide a process for preparing fibrous titanium dioxide. Another object of this invention is to provide a process for selectively making titanium dioxide fibers which have the rutile crystalline modification or the anatase crystalline modification. A further object of this invention is to provide titanium dioxide in fibrous form wherein the fibers range in size from colloidal to lengths up to 2 mm. and greater.

It has now been discovered that fibrous titanium dioxide having predominantly either the rutile or anatase crystalline modifications can be prepared by calcining at a temperature of from 800° to 950° C. alkali metal deficient titanate fibers. The calcination period may vary from about 30 minutes up to a day. However, calcination is conducted until crystallization occurs, and usually takes from about 0.5 to 10 hours and in most cases from 1 to 5 hours.

The alkali metal deficient titanate fibers used in this process are formed when potassium, sodium or other alkali metal titanates, preferably the hexatitanates and tetratitanates are treated with acidic agents, for example, mineral acids or inorganic chlorinating agents, such as titanium tetrachloride or chlorine gas, either in the aqueous or gaseous phases in order to remove alkali. By alkali deficient titanate is meant that the titanate is at least about 50 mole percent deficient in alkali, as compared with the normal stoichiometric amount. Of course, substantially all the alkali can be removed, therefore, there is no lower limit on the alkali concentration.

The novel fibrous titanium dioxide compositions of this invention can be represented by the formula $$(M_2O)_{1/x}(TiO_2)_6$$

consisting of crystalline titanium dioxide and at least one alkali metal oxide, expressed as $M_2O$, where M is selected from the group consisting of sodium, potassium, rubidium, cesium and combination thereof and wherein $x$ has a value greater than one and said alkali metal oxide is present in the fiber in amounts of from 0.1 to 10 percent by weight of the fiber. These fibrous titanium dioxide compositions are prepared by calcining at a temperature of from 800° to 950° C. a fibrous alkali deficient metal titanate having the formula $C_2O(TiO_2)_{4-9}$ wherein C represents a mixed cation selected from the group consisting of sodium, potassium, rubidium, cesium, hydrogen and $H_3O^+$ and combinations thereof, with the proviso that at least one metal cation is always present, thereby producing a fibrous titanium dioxide composition of matter having the formula 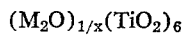. The resulting fibrous titanium dioxide material has an X-ray pattern characteristic of the crystalline structure of the anatase or rutile forms. For example, when sodium hexatitanate or tetratitanate are calcined the fibrous titanium dioxide material obtained is predominantly the rutile modification and by calcining potassium-containing hexatitanate or tetratitanate fibers a predominant amount of the anatase modification is obtained.

In the above formula $x$ may have any value greater than 1, for example, $x$ may be 500. The value of $x$ is merely dependent upon the extent of alkali removal treatment, the more extensive treatment will result in a higher value of $x$ and less alkali in the material. Of course, substantially all the alkali may be removed. However, in the above formula $x$ preferably has a value of from about 10 to 600.

The alkali metal titanates that are made alkali deficient before high temperature calcination are those having the formula $M_2O(TiO_2)_n$ where $n$ has a value of from 4 to 9 and M is an alkali metal of atomic number of at least 11, e.g., sodium, potassium, rubidium, cesium. A process for preparing these fibrous alkali metal titanates is described in U.S. Patent 2,833,620. Briefly, these fibrous titanates are prepared by reacting an alkali metal compound such as a carbonate, phosphate or hydroxide with an oxygen-containing titanium compound, for example, titanium dioxide or a soluble salt thereof such as titanous sulfate, using a ratio of alkaline metal to titanium calculated as alkali metal oxide to titanium dioxide of from 1 to 6 to 12 to 1. Generally, the ratio of from 1 to 1 and preferably 3 to 1, and 8 to 1 is employed in the presence of water at temperatures of at least 400° C. and a pressure of at least 200 atmospheres. Then too, suitable fibrous titanates can also be synthesized by the process described in U.S. Patent 2,841,470. This patent discloses a method wherein a fluoride or chloride of the alkali metals mentioned above or mixtures thereof are heated to a molten state at temperatures up to about 1200° C. to form a flux. For example, a non-fibrous titanate having the formula $M_2O(TiO_2)_{2m}$ wherein $m$ is an integer of from 2 to 3 and M is an alkali metal as indicated above, is dissolved in a molten alkali metal halide. Alternatively, titanium dioxide and a source of alkali metal oxide, as described above, may be added to the mixture until the molten halide flux is saturated with titanium dioxide and fibrous titanates are formed. Separation of the fibrous alkali metal titanates from the salt fluxes is effected by leaching with water at room temperature.

Utilizing the alkali titanates described above, alkali deficient titanate fibers having the formula $C_2O(TiO_2)_{4-9}$ and being at least 50 mole percent deficient in alkali are prepared suitably by several methods wherein the alkali-metal is converted to a water soluble salt which is readily removed from the crystal lattice. Treatment of the alkali titanates with mineral acids or halogenating agents such as reactive halides, halogen gas or hydrogen halide gases have been employed successfully to prepare the alkali deficient titanates. A preferred procedure is to treat the fibrous alkali titanate with warm dilute, about 1–30% mineral acid until the leaching rate of alkali metal is reduced to the point where further removal of alkali metal is impractically slow (below 5% per hour of the remaining alkali). Subjecting the alkali metal titanates to halogenating agents such as chlorine, $TiCl_4$ and HCl gases at temperatures of 300–800° C. are also effective to remove alkali. The soluble chlorides formed during this step can be removed by water leaching. Generally any means for removing alkali from the lattice without destroying the fibrous nature of the material is applicable. The general formula for alkali deficient titanates thus formed and used in the invention can be represented as $C_2O(TiO_2)_{4-9}$ where C represents a mixed cation selected from the group consisting of sodium, potassium, rubidium, cesium, hydrogen, hydronium ion, and combinations thereof with at least one metal always being present in an amount of about 50 mole percent at most, i.e. the alkali deficient metal titanates are at least about 50 mole percent deficient in alkali.

As an alternative procedure protonated titanate fibers can also be used as the starting material for forming the rutile or anatase crystalline modification of titanium dioxide. Such compounds, as the name indicates, are alkali deficient and therefore, these materials need only be calcined at 800° to 950° C. to form the product of the invention. These fibrous titanium dioxide crystalline modifications are described in U.S. Patent 3,129,105 and they are usually prepared by treating aqueous slurries of potassium titanate, sodium titanate and the like with dilute acids at a pH range of from 2 to 6 and at a temperature of about 80° C. and then calcining at temperatures of from 400° to 700° C. These materials contain predominantly titanium dioxide, usually 95% $TiO_2$ by weight. One essential difference between the protonated fiber and the fibrous titanium dioxide product of this invention is the degree to which the water of constitution has been removed from the acid-treated fiber. For example, as disclosed above, protonated fibers are made by treating titanate fibers in acid solutions until the $TiO_2$ content is in excess of 95% and then these materials are calcined at a temperature range of from 400° to 700° C. However, these materials still contain water, that is, water of constitution, rather than water of hydration and are stable up to about 700° C. In order to convert these protonated materials to the fibrous rutile or anatase modification of the present invention, it has been found necessary to calcine the protonated fibers at a temperature range of from 800° to 950° C. Calcination at temperatures above 950° to 1000° C. has a strong tendency to decompose the fiber, resulting in a material which is non-fibrous and non-flexible.

An important advantage of the present invention is the fact that the particle size of the fibrous titanium dioxide product can be selectively regulated by choosing an appropriate size titanate fiber used as a starting material. The process conditions do not substantially alter the fiber size. For example, colloidal fibrous material can be made by calcining colloidal fibers of alkali deficient titanates, including protonated titanates, having a size range from 0.005 micron to 0.1 micron in diameter and lengths of from 0.05 micron to 0.5 micron up to about 50 microns. Pigmentary size titanium dioxide fibers can be made in a similar fashion by calcining titanate fibers that are from 0.05 to 1 micron in diameter and having a length of from 0.5 to 400 microns. In cases where even larger sized fibrous material is desired titanate fibers having a diameter of more than 1 micron and lengths up to about 1 to 2 centimeters can be used as the starting materials and produced by processes described in U.S. Patents 2,841,470 and 2,833,620. The products of this invention have length to diameter ratios ranging from 10:1 to 10,000:1.

A clearer understanding of the invention can be obtained by considering the following specific examples. These are for purposes of further illustrating the novel procedure for preparing the new fibrous products and are not to be considered as limiting the scope of the invention.

Example 1

About 500 grams of pigmentary size potassium hexatitanate (averaging 0.2 micron in diameter with lengths up to 40–50 microns) was admixed with 10 liters of 10% sulfuric acid and stirred for a period of 2 hours at 25° C. After the acid-treating step has been completed 20 mls. of 0.1 M magnesium sulfate water solution are added to flocculate the fibrous material. About 9 liters of supernatant water is decanted after the fibrous material has settled overnight. After decantation the residue is filtered on a large Buchner funnel and washed with distilled water until the wash water is neutral to litmus paper. These fibers are then placed on a tray and dried at 120° C. overnight. The dried material was analyzed and was found to be alkali deficient containing 88.3% $TiO_2$ and 4.76% $K_2O$, which amounts to a $K_2O:TiO_2$ mole ratio of 1:21.9. The fibrous material is then placed in a calcination furnace at 950° C. for 1 hour. This material was subjected to X-ray analysis and was found to contain approximately 85% crystalline anatase in fibrous form. Microscopic examination and oil absorption tests (see U.S. 2,296,636) on the fibrous anatase material indicate that the fibrous structure and size is not significantly altered from that of the original pigmentary potassium titanate.

Example 2

Five hundred grams of pigmentary size sodium hexatitanate was added to 10 liters of 1% sulfuric acid (10 grams per liter) and heated at 85° C. for 3½ hours. During this time the sulfuric acid concentration dropped from 10 grams/liter to 4.41 grams/liter. The solution was cooled, allowed to settle after ½ gram of magnesium sulfate was added to cause coagulation. The mole ration of $Na_2O$-$TiO_2$ was determined by analysis to be 1:10. The fibrous material was then treated as outlined in Example 1. The X-ray analysis of these fibers indicated that 95% of the $TiO_2$ freed by leaching was converted to rutile, while 2.2% remained as anatase.

Example 3

Five hundred grams of fibrous pigmentary potassium tetratitanate was treated in 10 liters of 5% nitric acid solution at 50° C. for a period of 6 hours. Afterwards, the fibrous material was settled, decanted and washed according to the procedure of Example 1. The analysis of this material indicated that the $K_2O$-$TiO_2$ mole ratio was 1:26.5. This material was then calcined at 875° C. for a period of 3 hours. X-ray analysis indicated that the freed $TiO_2$ crystals in the fiber had been converted to the anatase crystalline modification.

Example 4

Five hundred grams of pigmentary size potassium-sodium-hexatitanate fibers having the formula $$NaKO(TiO_2)_6$$

was treated according to the procedure outlined in Example 2. Aanalysis indicated that 95% of the potassium and 50% of the sodium was removed from this material. X-ray analysis indicated that the $TiO_2$ freed by the acid treatment was 55% converted to the anatase modification while the remainder existed as rutile.

Example 5

Five hundred grams of sodium-potassium-hexatitanate having the formula 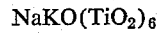 $NaKO(TiO_2)_6$ was treated with 10 litters of 3% hydrochloric acid for 48 hours at 90° C. This material was settled, decanted, filtered, and washed according to Example 1, and calcined at 800° C. for a period of 12 hours. This material was found to contain 97% free $TiO_2$ of which 25% existed as rutile while the remainder existed as anatase.

Example 6

One hundred grams of long fibrous potassium hexatitanate was placed in a tube furnace and heated to 300° C. The temperature was held between 300 and 500° C. for a period of 8 hours while dry hydrogen chloride gas was passed over the fibrous material. The rate of the hydrogen chloride gas was maintained such that the atmosphere was always saturated with hydrogen chloride. The material was then cooled and slurried in 10 liters of water to dissolve the potassium chloride which had formed during the acid treatment. The material was then permitted to settle. The supernatant liquid was decanted after which the material was filtered in a Buchner funnel and washed with water until the washings no longer tested for chloride and were neutral to litmus paper. This material was dried and was found to contain approximately 100% $TiO_2$ discounting the absorbed moisture in the crystal lattice. This material was then calcined at a temperature of 800 C. for 10 hours and yielded a fibrous pseudomorph of potassium titanate which contained approximately 85% titanium dioxide in the anatase crystalline modification.

Example 7

According to the procedure outlined in Example 6, sodium hexatitanate fibers were subjected in a tube furnace to an atmosphere of titanium tetrachloride vapor, a pressure up to 6 mm. Hg absolute for a period of 17 hours at 800° C. This material was washed and was determined to contain approximately 100% $TiO_2$ of which 50% was converted to rutile.

Example 8

In accordance with the procedure of Example 7, 100 grams of potassium hexatitanate fibers were subjected to an atmosphere of chlorine gas passing through the tube furnace for a period of 3 hours at 800° C. Although there was some loss of the fibrous structure from this treatment, the $TiO_2$ fibers were found to contain the anatase crystal modification.

Example 9

Protonated sodium hexatitanate of formula

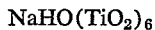

$NaHO(TiO_2)_6$ made according to U.S. Patent 3,129,105 was calcined at 850° C. for 4 hours. Approximately 75% of the free $TiO_2$ was converted to rutile while the remainder existed as anatase.

Example 10

One hundred grams of protonated potassium-rubidium-cesium hexatitanate $HKRbCsO_2(TiO_2)_{12}$ materials were calcined at 900° C. for 8 hours. These materials contained anatase $TiO_2$ predominantly.

It can be seen that this invention involves a process for preparing novel fibrous titanium dioxide compositions from alkali deficient alkali metal titanates of the general formula $C_2O(TiO_2)_{4-9}$ wherein the value of C is given above, by calcining them at temperatures of 800–950° C. until crystallization occurs, preferably from about 0.5 to 10 hours. Fibrous alkali metal deficient titanates have been made by treating alkali hexatitanates in such a manner that the alkali metal oxide has been dispelled by chemical reaction from the crystal lattice of the fiber to such a degree that the fiber contains essentially titanium dioxide, i.e. at least 50 mole percent deficient in alkali. The crystalline orientation of the $TiO_2$ is accomplished during the high temperature calcination, i.e. 800°–950° C. The $TiO_2$ product in such a state is highly useful as a grease additive or a special purpose paint and plastics pigment. Longer fibers of 1 micron diameter with lengths up to 1 centimeter are useful as felted materials which are usually produced by filtration as, for example, through a Fourdrinier screen or other methods known to the arts such as screening or tabling to concentrate the mat. The properties of mats produced by filtration can vary considerably in the sedimentation process by the relative amounts of coarse and fine titanium dioxide forms permitted to remain with the fibers. Thus, different mat structures, resulting by retention of coarser fibers and needles can be prepared, while fine forms of titanium dioxide or other materials can be retained in the fiber mat to alter density, porosity and other properties. In fact, fibrous rutile can be used as a binder for other forms of titanium dioxide. Such products can be used along with other fillers and extenders such as silica, carbon, asbestos, and many other substances can be introduced to provide additional desirable properties. The bulk density and other properties of filtered mats from titanium dioxide fibers can also be varied widely by suitable choice of fibers and suspension characteristics and by regulating conditions, for example, pressure and temperature conditions under which the suspending medium is separated from the fibers.

We claim:

1. A process for producing inorganic flexible fibrous material which comprises calcining at a temperature of from about 800° to 950° C. a fibrous alkali deficient metal titanate being at least 50 mole percent deficient in alkali and having the formula $C_2O(TiO_2)_{4-9}$ wherein C represents a mixed cation selected from the group consisting of sodium, potassium, rubidium, cesium, hydrogen and $H_3O^+$ and combinations thereof, with the proviso that at least one metal cation is always present thereby producing a composition of matter having the formula $(M_2O)_{1/x}(TiO_2)_6$ wherein $x$ has a value greater than one and M represents an alkali metal selected from the group consisting of sodium, potassium, rubidium, cesium and combinations thereof, the alkali oxide being present in the fiber in an amount of from 0.1 to 10% by weight expressed as $M_2O$, the fibrous titanium dioxide has an X-ray pattern characteristic of the crystalline structures of the anatase and rutile forms and said alkali metal deficient titanate is prepared by treating fibrous alkali metal titanates with an acidic agent in order to remove alkali.

2. The process according to claim 1 wherein M is sodium and said fibers exhibit X-ray patterns predominantly characteristic of the rutile crystalline modification of titanium dioxide.

3. The process according to claim 1 wherein M is potassium and said fibers exhibit X-ray patterns characteristic of the anatase crystalline modification of titanium dioxide.

4. The process according to claim 1 wherein the acidic agent is a mineral acid.

5. The process according to claim 1 wherein the acidic agent is an inorganic chlorinating agent.

6. A process for producing inorganic fibrous material which comprises calcining at a temperature of from about 800° to 950° C. for 0.5 to 10 hours a fibrous alkali deficient potassium hexatitanate being at least 50 mole percent deficient in alkali, thereby producing a product having the formula $(K_2O)_{1/x}(TiO_2)_6$ wherein $x$ has a value greater than one, the $K_2O$ being present in the fiber in amounts of from 0.1 to 10 percent by weight, the fibrous titanium dioxide has an X-ray pattern characteristic of the anatase crystalline modification and said alkali metal deficient hexatitanate is prepared by treating potassium hexatitanate with an acidic agent in order to remove alkali.

7. The process according to claim 6 wherein the acidic agent is a mineral acid.

8. A process for producing inorganic fibrous material which comprises calcining at a temperature of from about 800° to 950° C. for 0.5 to 10 hours a fibrous alkali deficient sodium hexatitanate being at least 50 mole percent deficient in alkali, thereby producing a product having the formula $(Na_2O)_{1/x}(TiO_2)_6$ wherein $x$ has a value greater than one, the $Na_2O$ being present in the fiber in amounts of from 0.1 to 10 percent by weight, the fibrous titanium dioxide has an X-ray pattern characteristic of the rutile crystalline modification and said alkali metal deficient hexatitanate is prepared by treating sodium hexatitanate with an acidic agent in order to remove alkali.

References Cited

UNITED STATES PATENTS

| | | | |
|---|---|---|---|
| 2,833,620 | 5/1958 | Gier et al. | 23—51 |
| 2,841,470 | 7/1958 | Berry | 23—51 |
| 3,030,183 | 4/1962 | Berry | 23—202 |
| 3,129,105 | 4/1964 | Berry et al. | 106—55 |

OSCAR R. VERTIZ, *Primary Examiner.*

H. T. CARTER, *Assistant Examiner.*